(12) United States Patent
Ko et al.

(10) Patent No.: US 10,994,684 B2
(45) Date of Patent: May 4, 2021

(54) AIRBAG DEVICE FOR VEHICLE

(71) Applicant: Hyundai Mobis Co., Ltd., Seoul (KR)

(72) Inventors: Seok Hoon Ko, Yongin-si (KR); Do Hyoung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/295,550

(22) Filed: Mar. 7, 2019

(65) Prior Publication Data

US 2019/0275976 A1    Sep. 12, 2019

(30) Foreign Application Priority Data

Mar. 9, 2018    (KR) .................. 10-2018-0027849

(51) Int. Cl.
*B60R 21/203*    (2006.01)
(52) U.S. Cl.
CPC .................... *B60R 21/203* (2013.01)
(58) Field of Classification Search
USPC ...................................................... 280/728.2
See application file for complete search history.

(56) References Cited

U.S. PATENT DOCUMENTS

| | | | | |
|---|---|---|---|---|
| 7,185,915 B2* | 3/2007 | Fujita | ................ | B60R 21/2037 280/731 |
| 7,264,266 B2* | 9/2007 | Erlingstam | ......... | B60R 21/2035 280/728.2 |
| 7,708,309 B2* | 5/2010 | Kim | ..................... | B60R 21/217 280/731 |
| 8,448,982 B2* | 5/2013 | Yamaji | ............... | B60R 21/2037 280/728.2 |
| 8,511,707 B2* | 8/2013 | Amamori | ........... | B60R 21/2035 280/728.2 |
| 8,919,812 B2* | 12/2014 | Schutz | ............... | B60R 21/2037 280/728.2 |
| 9,783,147 B2* | 10/2017 | Spencer | ............. | B60R 21/2035 |
| 2008/0012270 A1* | 1/2008 | Weigand | ............... | B60Q 5/003 280/728.2 |
| 2012/0306184 A1* | 12/2012 | Yamaji | ............... | B60R 21/2037 280/731 |
| 2012/0313357 A1* | 12/2012 | Yamaji | ................ | B60R 21/203 280/731 |
| 2015/0210239 A1* | 7/2015 | Sakaguchi | ........... | B60R 21/203 280/728.2 |
| 2016/0297390 A1* | 10/2016 | Raikar | ............... | B60R 21/2035 |
| 2017/0015267 A1* | 1/2017 | Ko | ...................... | B60R 21/2035 |
| 2017/0021792 A1* | 1/2017 | Kim | ....................... | B60Q 5/003 |

* cited by examiner

*Primary Examiner* — James A Shriver, II
*Assistant Examiner* — Hilary L Johns
(74) *Attorney, Agent, or Firm* — H.C. Park & Associates, PLC (57) ABSTRACT

An airbag device for a vehicle may include: a mounting housing having an airbag module mounted therein; one or more holders formed on the mounting housing; a steering wheel engaged to the holders; one or more mounting members slidably inserted into the engagement portion between the mounting housing and the steering wheel; and one or more hook members installed at positions spaced a predetermined distance apart from the center of the steering wheel, in order to fix the mounting member at a plurality of points.

9 Claims, 12 Drawing Sheets

AIRBAG DEVICE FOR VEHICLE

CROSS-REFERENCES TO RELATED APPLICATIONS

The present application claims priority from and the benefit of Korean Patent Application No. 10-2018-0027849, filed on Mar. 9, 2018, which is hereby incorporated by reference for all purposes as if set forth herein.

BACKGROUND

Field

The present invention relates to an airbag device for a vehicle, and more particularly, to an airbag device for a vehicle, which includes an enhanced join maintenance structure between a mounting housing and a steering wheel, and thus can increase an emotional quality when a horn is operated.

Discussion of the Background

In general, an airbag system installed at a driver seat of a vehicle serves to momentarily inflate an airbag (air pocket) between a driver and a steering handle in case of a vehicle collision, and thus reduce an injury of the driver, which may be caused by shock.

Such an airbag system for a driver seat includes an airbag module for the driver seat, a shock sensor and an electronic control module. The airbag module includes an inflator for generating gas through ignition of a detonator, an airbag expanded and deployed toward a driver in the driver seat by the generated gas, a mounting housing having the inflator installed therein and fixed to a steering wheel, and a horn plate installed at the top of the mounting housing. The shock sensor senses a collision when the collision occurs, and generates a shock signal. The electronic control module ignites the detonator of the inflator according to the shock signal.

The conventional airbag system has employed a snap-fit structure to maintain the state in which the mounting housing is joined to the steering wheel, when the airbag is deployed. In this case, however, since many parts are used, the production cost is inevitably increased. Furthermore, since the assembly property is reduced, the separating and joining process between the mounting housing and the steering wheel may not be smoothly performed.

In order to solve the above-described problems, an enhanced join maintenance structure has been proposed. In the join maintenance structure, a mounting member having a mounting clip installed thereon is slid and inserted into the joined portion between the mounting housing and the steering wheel, and a hook for fixing the mounting member is installed on the steering wheel in order to maintain the joined state between the mounting housing and the steering wheel. In case of need for repair, the fixing of the mounting member may be removed to smoothly separate the mounting housing from the steering wheel.

However, since the structure that maintains the joined state between the mounting housing and the steering wheel using the hook and the mounting member having the mounting clip installed thereon has a short axis distance for horn operation, a non-uniform horn operation feel may be caused to reduce an emotional quality when the horn is operated. Furthermore, since one mounting member is supported by one hook, the structure may not be reliably supported when the airbag is deployed. Furthermore, since a gap is formed at the contact point between the hook and a mounting bar due to manufacturing tolerance of the hook, noise may occur.

The above information disclosed in this Background section is only for enhancement of understanding of the background of the invention and, therefore, it may contain information that does not constitute prior art.

SUMMARY

Embodiments of the present invention are directed to an airbag device for a vehicle, which includes an enhanced join maintenance structure between a mounting housing and a steering wheel, and thus can increase an emotional quality when a horn is operated.

In one embodiment, an airbag device for a vehicle may include: a mounting housing having an airbag module mounted therein; one or more holders formed on the mounting housing; a steering wheel engaged to the holders; one or more mounting members slidably inserted into the engagement portion between the mounting housing and the steering wheel; and one or more hook members installed at positions spaced a predetermined distance apart from the center of the steering wheel, in order to fix the mounting member at a plurality of points.

The holder may include: one or more fixing parts protruding from a bottom surface of the mounting housing, and having a fixing hole to which the mounting members is fixed; one or more cover parts bent and extended from the fixing part, and restricting the mounting member from moving upward or downward; and one or more guide parts bent and extended from the cover part, connected to the bottom surface of the mounting housing, and restricting the mounting member from moving to the left or right, wherein the fixing part, the cover part, the guide part and the bottom surface of the mounting housing form an insertion hole into which the mounting member is inserted.

The mounting member may include: a body slidably inserted into the insertion hole of the holder; and an elastic part installed on the body, and having an end fixed to the fixing hole of the fixing part to prevent the body from being separated from the insertion hole.

The hook member may include: a first hook fixing the body at a position within both ends of the holder; and a second hook fixing the body at a position out of any one end of the holder.

The first hook may include: a first protrusion formed at a position spaced a predetermined distance apart from the center of the steering wheel; and a first fixing part bent and extended from the first protrusion so as to fix the body, wherein the second hook comprises: a second protrusion formed at a position spaced a predetermined distance apart from the center of the steering wheel and spaced a predetermined distance apart from the first protrusion; and a second fixing part bent and extended from the second protrusion so as to fix the body.

A distance from the surface of the steering wheel to the first fixing part may be larger than a distance from the surface of the steering wheel to the second fixing part.

A recessed portion may be formed on a bottom surface of the mounting housing, and the body is movable in the recessed portion.

The mounting housing may include a plurality of bosses coupled to the steering wheel and providing an elastic restoring force between the mounting housing and the steering wheel, the body is moved to the first hook by the elastic restoring force of the bosses.

The body may be in contact with the first hook and the second hook.

The recessed portion may have a depth larger than a distance between the first fixing part of the first hook and the body.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 1:
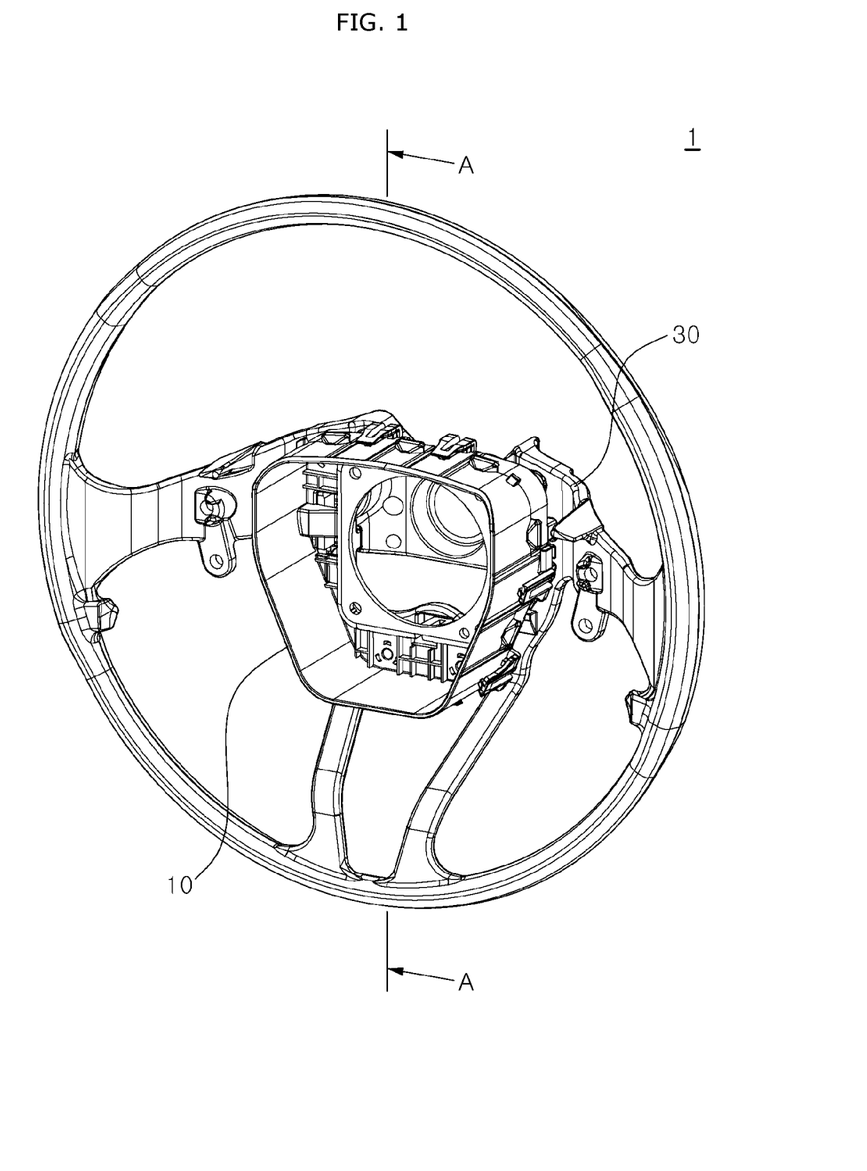
FIG. 1 is a diagram schematically illustrating an airbag device for a vehicle in accordance with an embodiment of the present invention.
Figure 2:
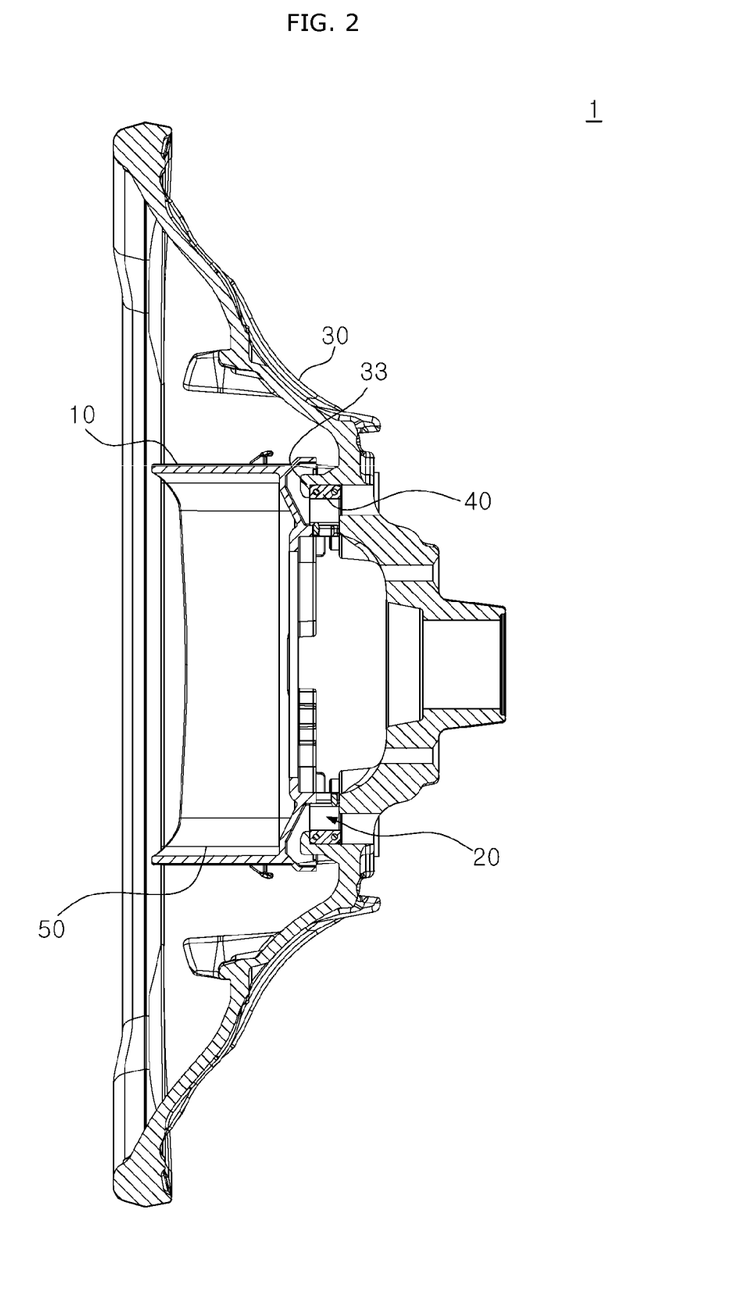
FIG. 2 is a cross-sectional view taken along the line A-A of FIG. 1.
Figure 3:
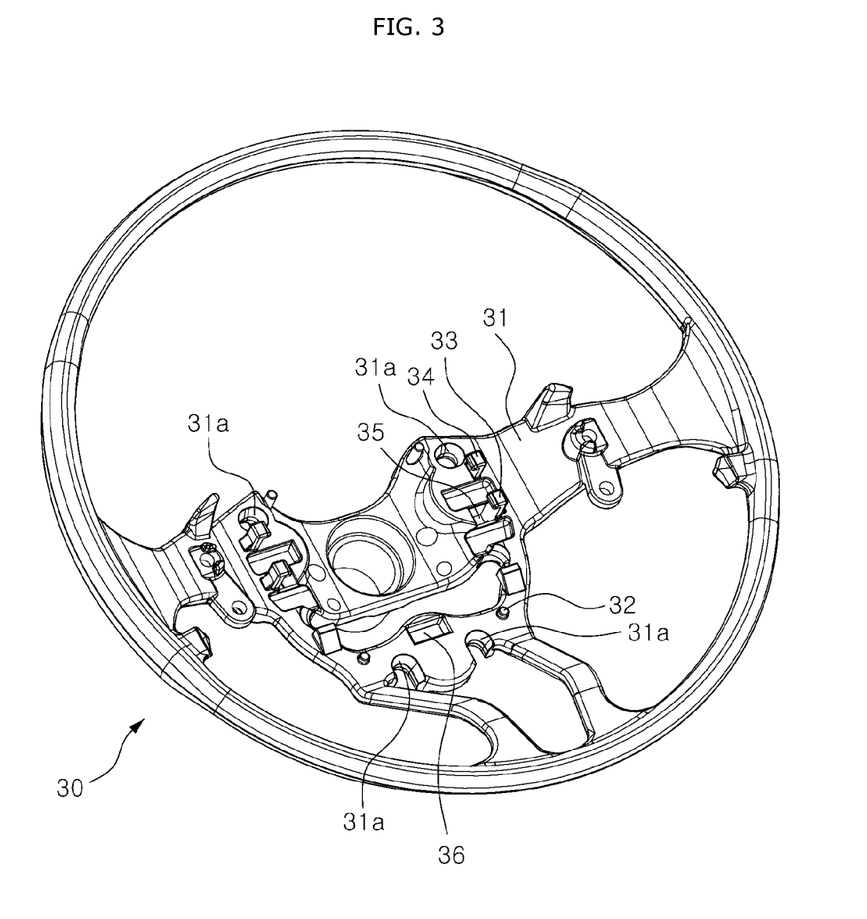
FIG. 3 is a diagram schematically illustrating a steering wheel of the airbag device for a vehicle in accordance with the embodiment of the present invention.
Figure 4:
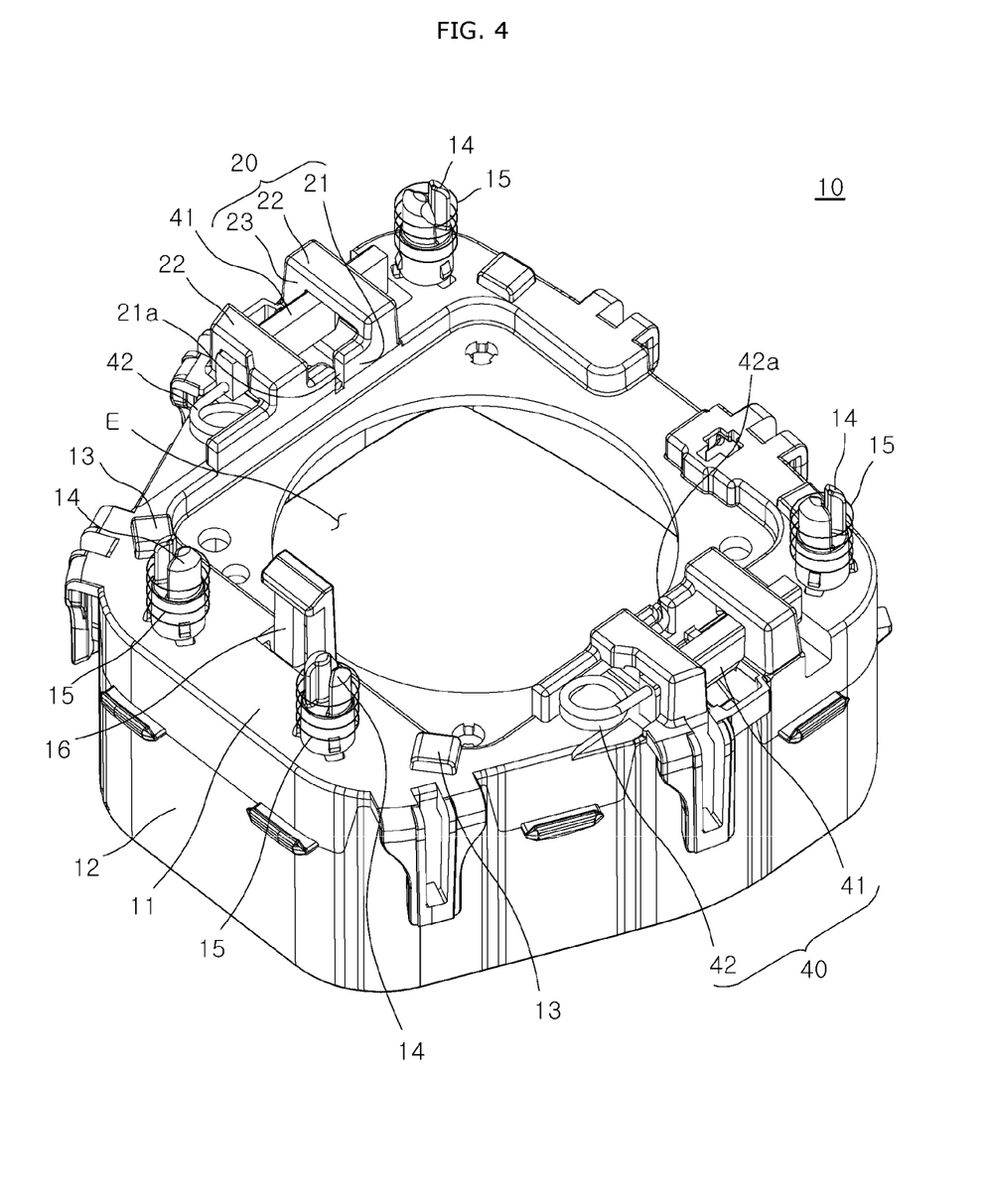
FIG. 4 is a diagram schematically illustrating a mounting housing of the airbag device for a vehicle in accordance with the embodiment of the present invention.
Figure 5:
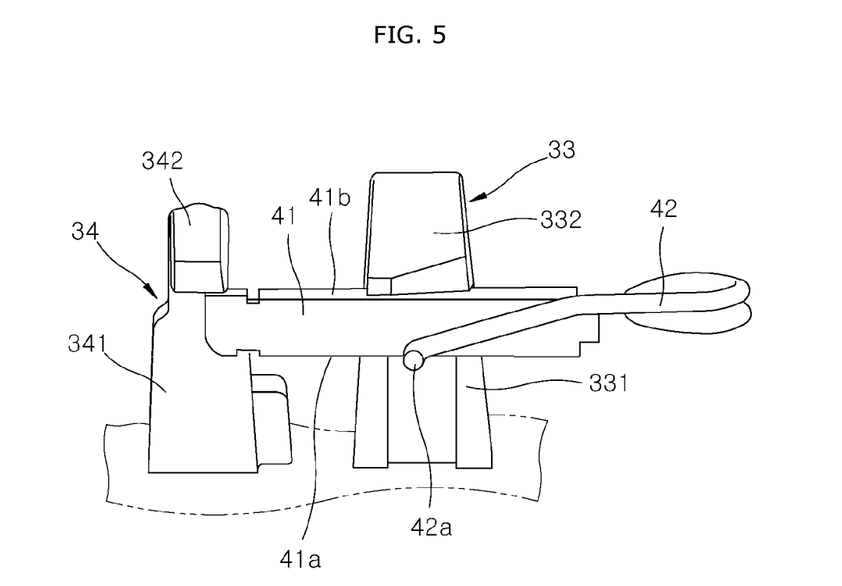
FIG. 5 is a diagram illustrating a hook member applied to the airbag device for a vehicle in accordance with the embodiment of the present invention.
Figure 6:
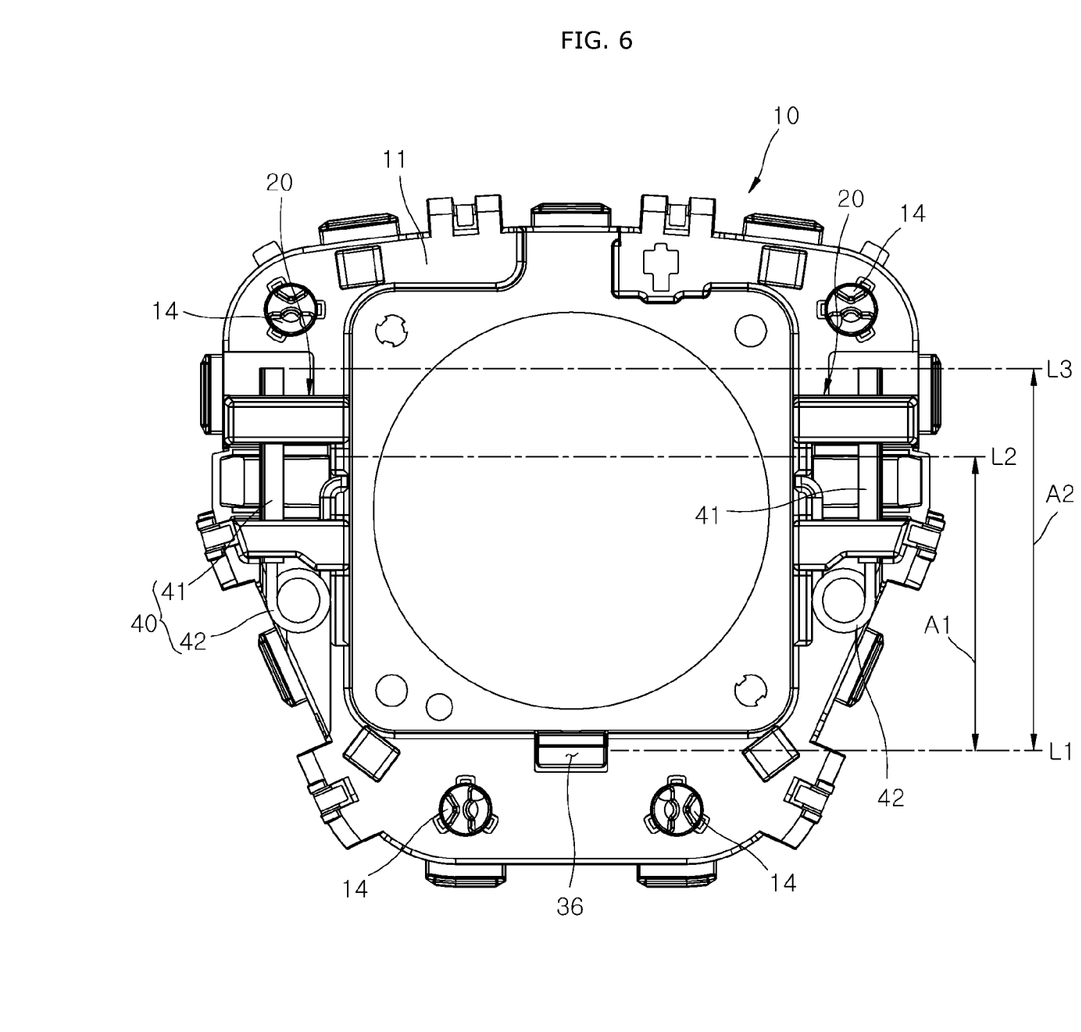
FIG. 6 is a diagram illustrating the bottom surface of the mounting housing of the airbag device for a vehicle in accordance with the embodiment of the present invention.
Figure 7:
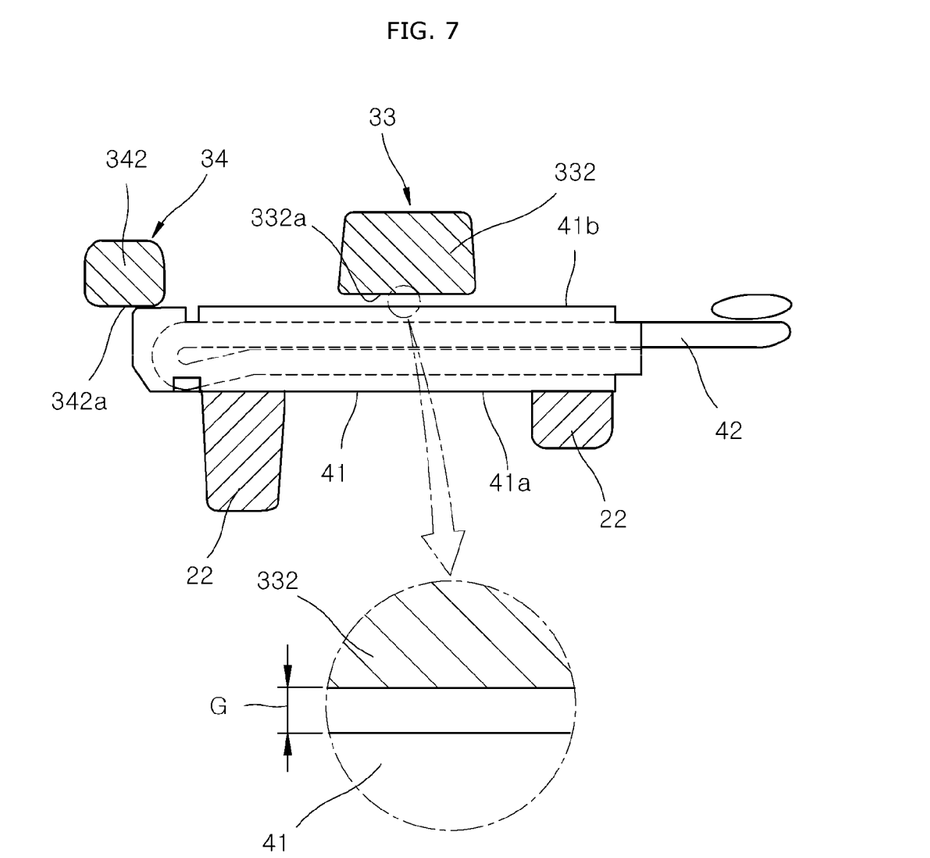
FIG. 7 is a diagram schematically illustrating a mounting member and the hook member of the airbag device for a vehicle in accordance with the embodiment of the present invention.
Figure 8:
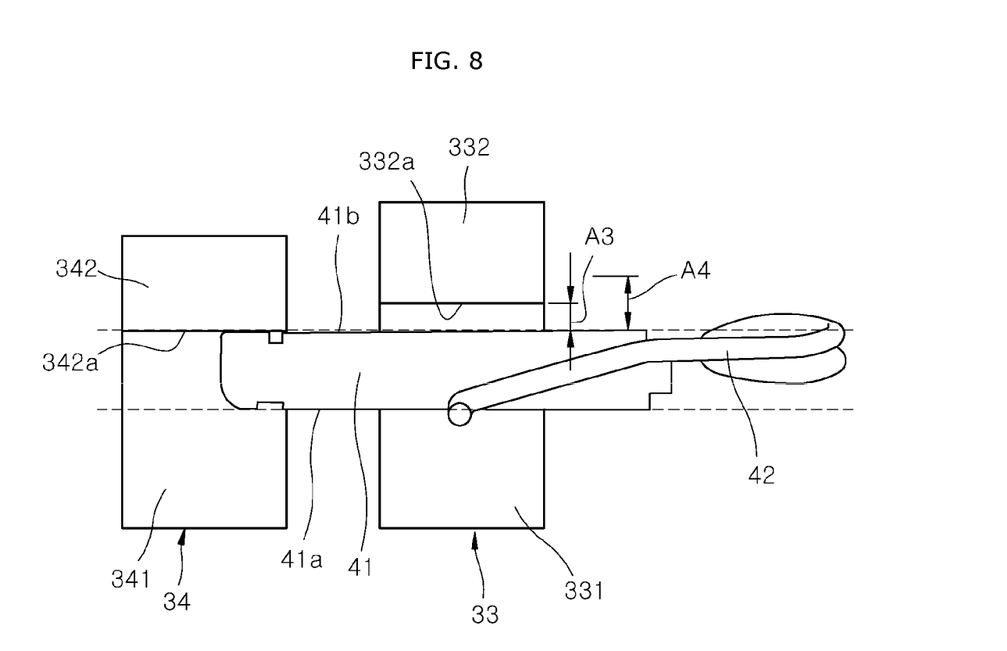
FIG. 8 is a diagram illustrating the mounting member and the hook member of the airbag device for a vehicle in accordance with the embodiment of the present invention.
Figure 9:
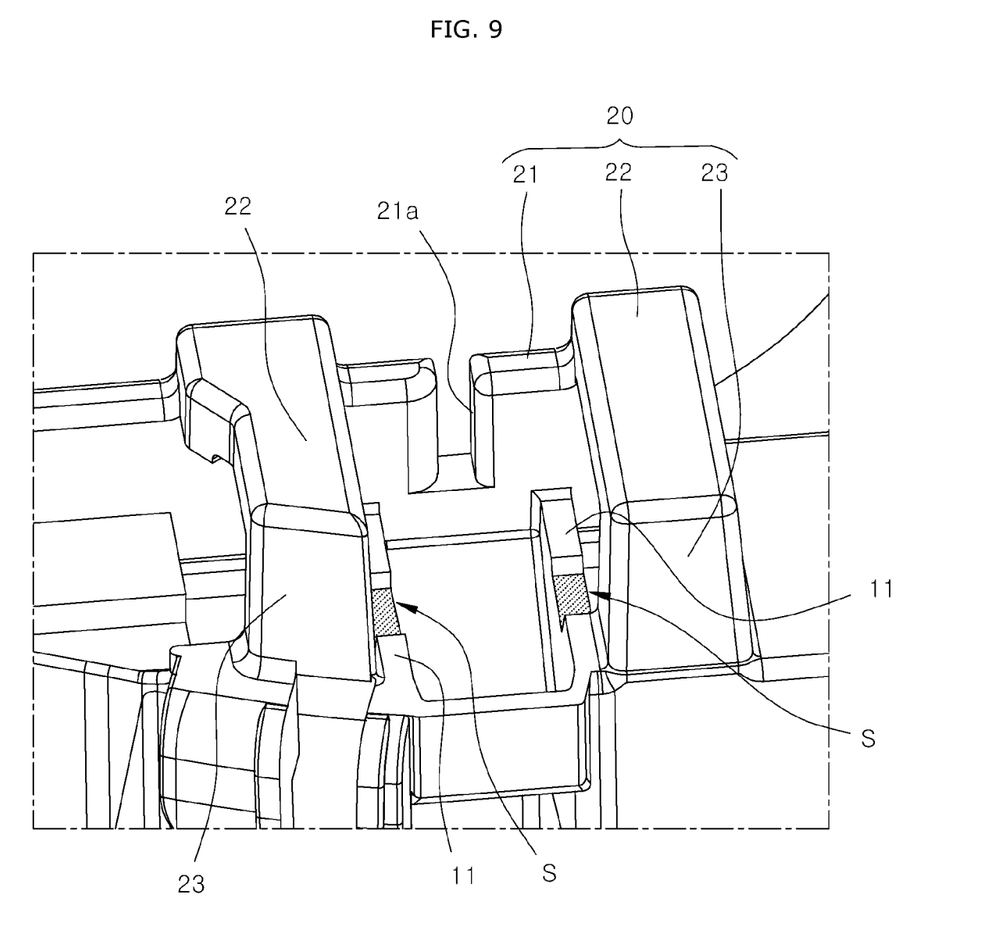
FIG. 9 is a diagram illustrating a holder and a recessed portion which are formed in the mounting housing of the airbag device for a vehicle in accordance with the embodiment of the present invention.
Figure 10:
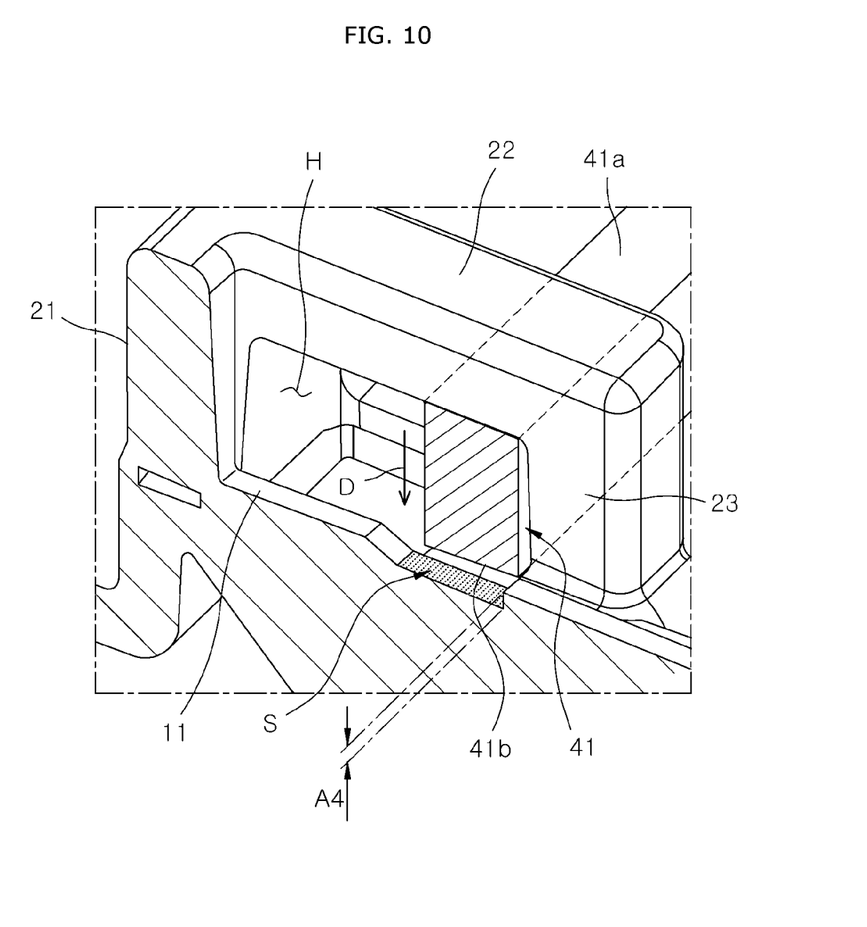
FIG. 10 is a sectional diagram illustrating the recessed portion which is formed in the mounting housing of the airbag device for a vehicle in accordance with the embodiment of the present invention.
Figure 11:
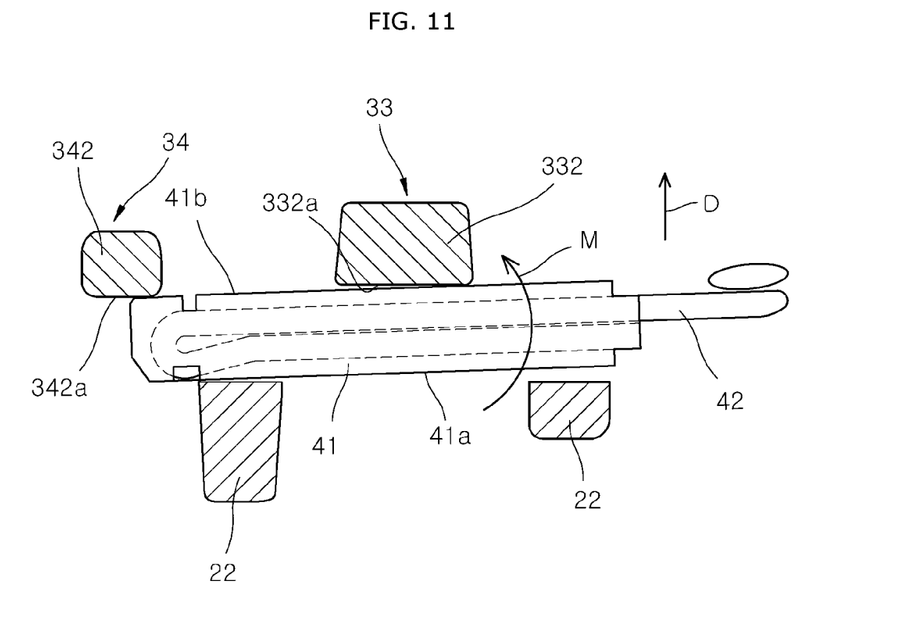
FIG. 11 is a diagram schematically illustrating a state in which the mounting member rotates at the recessed portion of the mounting housing in the airbag device for a vehicle in accordance with the embodiment of the present invention.
Figure 12:
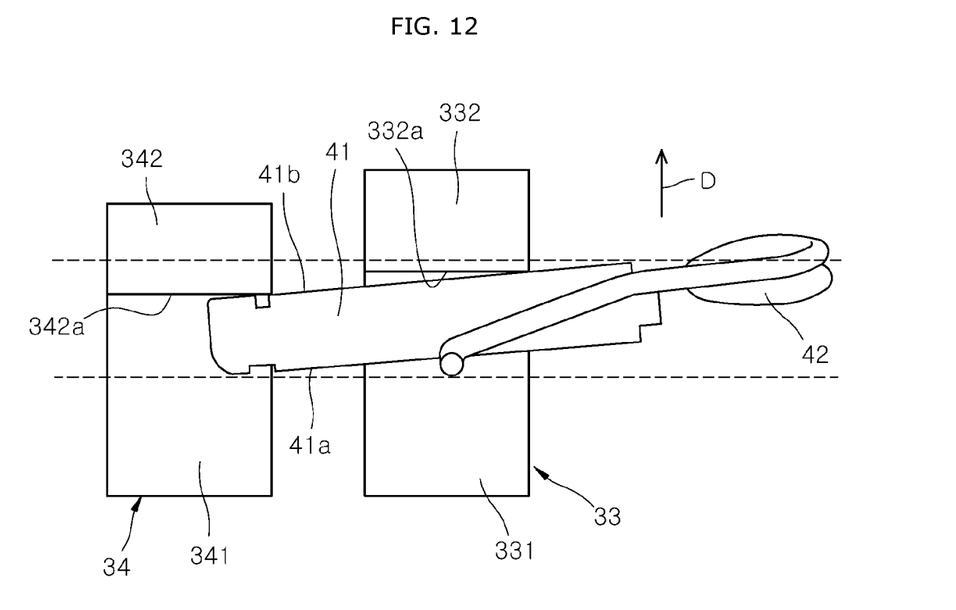
FIG. 12 is a diagram illustrating a state in which the mounting member rotates at the recessed portion of the mounting housing in the airbag device for a vehicle in accordance with the embodiment of the present invention.

FIG. 1 is a diagram schematically illustrating an airbag device for a vehicle in accordance with an embodiment of the present invention. FIG. 2 is a cross-sectional view taken along the line A-A of FIG. 1. FIG. 3 is a diagram schematically illustrating a steering wheel of the airbag device for a vehicle in accordance with the embodiment of the present invention. FIG. 4 is a diagram schematically illustrating a mounting housing of the airbag device for a vehicle in accordance with the embodiment of the present invention. FIG. 5 is a diagram illustrating a hook member applied to the airbag device for a vehicle in accordance with the embodiment of the present invention. FIG. 6 is a diagram illustrating the bottom surface of the mounting housing of the airbag device for a vehicle in accordance with the embodiment of the present invention. FIG. 7 is a diagram schematically illustrating a mounting member and the hook member of the airbag device for a vehicle in accordance with the embodiment of the present invention. FIG. 8 is a diagram illustrating the mounting member and the hook member of the airbag device for a vehicle in accordance with the embodiment of the present invention. FIG. 9 is a diagram illustrating a holder and a recessed portion which are formed in the mounting housing of the airbag device for a vehicle in accordance with the embodiment of the present invention. FIG. 10 is a sectional diagram illustrating the recessed portion which is formed in the mounting housing of the airbag device for a vehicle in accordance with the embodiment of the present invention. FIG. 11 is a diagram schematically illustrating a state in which the mounting member rotates at the recessed portion of the mounting housing in the airbag device for a vehicle in accordance with the embodiment of the present invention. FIG. 12 is a diagram illustrating a state in which the mounting member rotates at the recessed portion of the mounting housing in the airbag device for a vehicle in accordance with the embodiment of the present invention.

Referring to FIGS. 1 to 4, the airbag device for a vehicle in accordance with the embodiment of the present invention may include a mounting housing 10, a holder 20, a steering wheel 30, one or more mounting members 40 and one or more hook members.

The mounting housing 10 may have an airbag module 50 mounted therein. The mounting housing 10 may have one open side, and the airbag module 50 may include an inflator and an airbag cushion which is deployed by gas generated when a detonator of the inflator is ignited. The airbag module 50 may be stored in the mounting housing 10.

When an external force is applied to operate a horn, the mounting housing 10 may be moved downward by the external force.

The mounting housing 10 may include a bottom surface 11, a sidewall 12, a plurality of horn pressing parts 13, a plurality of bosses 14 and 15, and a bottom joining part 16.

The airbag module 50 may be installed in a space E formed by the bottom surface 11 and the sidewall 12.

The sidewall 12 may be extended toward the top surface from the edge of the bottom surface 11. The airbag module 50 may be surrounded and protected by the sidewall 12. A cuttable cover plate may be formed at the top surface of the airbag module 50. When the airbag cushion is deployed, the cover plate may be cut to protect a driver.

The plurality of horn pressing parts 13 may be formed on the bottom of the bottom surface 11. The horn pressing parts 13 may be uniformly distributed and disposed at the edge of the bottom surface 11. For example, the plurality of horn pressing parts 13 may be disposed at the edge of the bottom surface 11 so as to be spaced apart from each other.

When the driver presses the mounting housing 10, the bottom surface 11 may be moved toward the steering wheel 30. When the steering wheel 30 senses the horn pressing parts 13, a separate warning device may generate a warning sound.

Each of the bosses 14 and 15 includes a boss body 14 and a restoration part 15. The plurality of bosses 14 and 15 provide an elastic restoring force between the mounting housing 10 and the steering wheel 30.

The plurality of boss bodies 14 may be protruded from the bottom surface 11 and passed through the steering wheel 30 when the mounting housing 10 is joined to the steering wheel 30. For example, the boss bodies 14 may be disposed at the respective corners of the bottom surface 11, and passed through the steering wheel 30 to guide assembly positions.

The plurality of restoration parts 15 may be disposed between the bottom surface 11 and the steering wheel 30 to elastically support the bottom surface 11. For example, each of the restoration parts 15 may have the shape of a coil spring wound around the boss body 14, and return the mounting housing 10 to the original position when the external force is removed.

In the embodiment, a plurality of holders 20 are formed on the bottom surface 11 of the mounting housing 10. One holders are disposed on one side of the mounting housing 10, and the other holders are disposed on the other side of the mounting housing 10. The holders 20 are also provided so that the mounting members 40 are locked.

Each of the holders 20 may include one or more fixing parts 21, one or more cover parts 22 and one or more guide parts 23. The fixing part 21 may be protruded from the bottom surface 11 of the mounting housing 10 and have a fixing hole 21a to which the mounting member 40 is fixed. The cover part 22 may be bent and extended from the fixing part 21, and restrict the mounting member 40 from moving upward or downward. The guide part 23 may be bent and extended from the cover part 22, connected to the bottom surface 11 of the mounting housing 10, and restrict the mounting member 40 from moving left/right direction.

The fixing part 21, the cover part 22 and the guide part 23 of the holder 20 and the bottom surface 11 of the mounting housing 10 may define or form an insertion hole H into which the mounting member 40 is inserted.

The steering wheel 30 may be engaged to the holder 20 formed on the bottom surface 11 of the mounting housing 10. The steering wheel 30 may have a steering shaft (not illustrated) mounted thereon, the steering shaft enabling a driver to perform a steering operation. For example, when the driver rotates the steering handle, the steering wheel 30 may be rotated with the steering handle, and the angle of wheels may be adjusted through rotation of the steering shaft mounted on the steering wheel 30.

Such a steering wheel 30 may sense a horn operation when the mounting housing 10 is moved downward, and include, as illustrated in FIG. 3, a wheel plate part 31, a horn sensing part 32, a hook member, a wheel removal hole 35 and a bottom joining hole 36. The hook member will be separately described below.

The wheel plate part 31 may have a plurality of boss holes 31a through which the boss bodies 14 of the mounting housing 10 are passed. When the boss bodies 14 are inserted into the respective boss holes 31a, the assembly position of the mounting housing 10 may be induced as designed. The restoration parts 15 surrounding the boss bodies 14 may be seated on the wheel plate part 31 to support the bottom surface 11.

The horn sensing part 32 may be formed on the wheel plate part 31, and sense whether the horn pressing part 13 of the mounting housing 10 is contacted. When the horn pressing part 13 is contacted by the horn sensing part 32, a warning sound may be generated.

The wheel removal hole 35 may be formed in the wheel plate part 31, and expose a part of the mounting member 40 to the outside such that the mounting member 40 is movable. For example, the mounting member 40 may be covered by the holder 20, but exposed to the outside through the wheel removal hole 35. The mounting member 40 may be slid and moved through the wheel removal hole 35.

Referring to FIGS. 4 to 12, in the embodiment, a plurality of mounting members 40 are provided. The mounting members 40 are disposed on the bottom surface 11 of the mounting housing 10. One mounting member(s) 40 is disposed on one side of the mounting housing 10, and the other mounting member(s) 40 is disposed on the other side of the mounting housing 10.

Each of the mounting members 40, as illustrated in FIG. 5, may be slid and inserted into the joined portion between the mounting housing 10 and the steering wheel 30, in order to maintain the joined state between the mounting housing 10 and the steering wheel 30. The mounting member 40 may be installed at each of the left and right sides of the mounting housing 10.

Each of the mounting members 40 may include a body 41 and an elastic part 42. The body 41 may be slid and inserted into the insertion hole H formed in the holder 20. The elastic part 42 may be installed on the body 41 and have an end 42a fixed to the fixing hole 21a formed in the fixing part 21 of the holder 20, such that the body 41 is prevented from being separated from the insertion hole H.

The body 41 includes a first surface 41a facing the cover part 22 of the holder 20 and a second surface 41b contacted to the hook member.

The body 41 of the mounting member 40 may be made of resin, and the elastic part 42 may be made of a metallic material, and formed on the body 41 through insert injection molding.

A plurality of hook members may be installed at the left and right sides of the steering wheel 30, respectively, which are spaced a predetermined distance apart from the center of the steering wheel 30, in order to fix the mounting members 40 at a plurality of positions.

Referring to FIGS. 4 and 5, each of the hook members may include the first hook 33 and a second hook 34. The first hook 33 may serve to fix the body 41 at a position within both ends of the holder 20, and the second hook 34 may serve to fix the body 41 at a position out of any one end of the holder 20.

The first hook 33 may include a first protrusion 331 and a first fixing part 332. The first protrusion 331 may be formed at a position spaced a predetermined distance apart from the center of the steering wheel 30, and the first fixing part 332 may be bent and extended from the first protrusion 331 so as to fix the body 41 of the mounting member 40.

The second hook 34 may include a second protrusion 341 and a second fixing part 342. The second protrusion 341 may be formed at a position spaced a predetermined distance apart from the center of the steering wheel 30 and spaced a predetermined distance apart from the first protrusion 331, and the second fixing part 342 may be bent and extended from the second protrusion 341 so as to fix the body 41 of the mounting member 40.

The fixing operations of the first and second hooks 33 and 34 can maintain the joined state between the mounting housing 10 and the steering wheel 30 even when the airbag module 50 is deployed. Unlike the conventional airbag device, the second hook 34 as well as the first hook 33 may support the mounting member 40 to reinforce the support structure, which makes it possible to raise the robustness of the structure when the airbag is deployed.

As illustrated in FIG. 6, the body 41 of the mounting member 40 may be supported by the second hook 34 around a virtual line L3. Thus, when the horn is operated, a distance A2 from a virtual line L1 around the bottom joining part 36 corresponding to a lower support point to a virtual line L3 corresponding to an upper support point in the mounting housing 10 may be increased more than a distance A1 from the virtual line L1 around the bottom joining part 36 corresponding to a lower support point to the virtual line L2 corresponding to an upper support point in the conventional structure. Such an increase in axis distance can uniformize the horn operation feel, which makes it possible to improve the emotional quality.

The body 41 of the mounting member 40 may be contacted by only any one of the first and second fixing parts 332 and 342 due to manufacturing tolerance. For example, as illustrated in FIG. 7, a gap G may be formed between the first fixing part 332 of the first hook 33 and the body 41 of the mounting member 40. The gap G may generate noise, and cause an imbalance in force when two hooks 33, 34 are applied.

Therefore, as illustrated in FIG. 8, a distance from the surface of the steering wheel 30 to a first fixing surface 332a of the first hook 33 may be set to a larger value than a distance from the surface of the steering wheel 30 to a second fixing surface 342a of the second hook 34. Thus, the body 41 of the mounting member 40 may be always contacted by the second fixing surface 342a of the second fixing part 342, which makes it possible to reduce an occurrence of noise.

In order to remove noise problems and uneven power problems, a recessed portion S is formed on a bottom surface 11 of the mounting housing 10, and the body 41 is movable in the recessed portion S, as illustrated in FIGS. 9 and 10. That is, the recessed portion S which is recessed more than the surroundings may be formed at the contact point between the mounting housing 10 and the body 41 inserted into the insertion hole H.

The distance from the surface of the steering wheel 30 to the second fixing surface 342a is shorter than the distance from the surface of the steering wheel 30 to the first fixing surface 332a (see FIG. 8). Therefore, the body 41 of the mounting member 40 is first brought into contact with the second fixing surface 342a before contacting the first fixing surface 332a. As a result, the body 41 is always in contact with the second fixing surface 342a.

At this time, when the gap G is generated between the first fixing surface 332a of the first hook 33 and the body 41, the body 41 is moved or rotated by the elastic restoring force of the restoration parts 15 of the bosses 14 and 15. That is, due to the elastic restoring force of the restoration parts 15, the mounting housing 10 and the holder 20 move in the direction of the arrow D. Therefore, the body 41 is pushed by the mounting housing 10 and the holder 20 and moved in the same direction D. The body 41 is rotated with the contact point with the second fixing surface 342a as a hinge axis.

Referring to FIGS. 11 to 12, the body 41 of the mounting member 40 is rotated in the direction M of reducing the gap G between the first fixing surface 332a of the first hook 33 and the body 41.

The body 41 of the mounting member 40 moves in the direction of the arrow D in the direction away from the cover part 22 due to the restoring force of the restoration parts 15 of the bosses 14 and 15. At this time, the body 41 of the mounting member 40 can be moved further by a depth A4 of the recessed portion S.

The depth A4 of the recessed portion S is formed to be larger than a distance A3 of the gap G between the first fixing surface 332a of the first hook 33 and the body 41. Therefore, the moving distance of the body 41 is secured by the depth A4 of the recessed portion S. The body 41 is moved and contacts the first fixing surface 332a of the first hook 33 so that the gap G between the first fixing surface 332a of the first hook 33 and the body 41 is eliminated. This prevents noise generation.

Due to the recessed portion S, the body 41 may be induced to rotate at a predetermined angle in an arrow direction M by the elastic part 42 as illustrated in FIG. 11.

The recessed portion S illustrated in FIG. 10 may have the depth A4 larger than the distance A3 between the first fixing part 332 of the first hook 33 and the body 41 of the mounting member 40. The gap G may occur due to manufacturing tolerances and the like.

Then, as illustrated in FIG. 12, the body 41 of the mounting member 40 may be rotated at the predetermined angle, and always contacted by the first and second fixing parts 332 and 342, which makes it possible to remove the noise and the imbalance in force when two hooks are applied.

In accordance with the embodiment of the present invention, the join maintenance structure between the mounting housing and the steering wheel can be enhanced to uniformize the horn operation feel, thereby improving the emotional quality. Furthermore, since two hooks are applied to reinforce the support structure for the mounting member 40, the robustness of the structure can be increased when the airbag is deployed. Furthermore, the recessed portion may be formed at the position where the mounting member 40 is seated, such that the two hooks and the mounting member 40 are always contacted with each other. Therefore, it is possible to suppress noise in the joined portion due to the gap formed by the manufacturing tolerance, and to remove the imbalance in force due to the application of two hooks.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag device for a vehicle, comprising:
   a mounting housing having an airbag module mounted therein;
   at least two holders disposed on the mounting housing;
   a steering wheel engaged with the at least two holders;
   at least two mounting members, each of which is received in an engagement portion of each holder disposed between the mounting housing and the steering wheel; and
   at least two hook members installed at positions spaced a predetermined distance apart from a center of the steering wheel to attach the at least two mounting members with the at least two hook members at a plurality of points,
   wherein the holder comprises:

one or more fixing parts protruding from a bottom surface of the mounting housing, and defining a fixing hole in which the mounting member is received;
one or more cover parts bent and extending from the fixing part to restrict the mounting member from moving upward or downward; and
one or more guide parts bent and extending from the cover part and connected to the bottom surface of the mounting housing to restrict the mounting member from moving to the left or right,
wherein the fixing part, the cover part, the guide part and the bottom surface of the mounting housing form an insertion hole into which the mounting member is inserted,
wherein the mounting member comprises a body received in the insertion hole of the holder,
wherein the hook member comprises:
a first hook fixing the body at a position between both ends of the holder; and
a second hook fixing the body at a position outside of any one end of the holder,
wherein the first hook comprises:
a first protrusion formed at a position spaced at a predetermined distance apart from the center of the steering wheel; and
a first fixing part bent and extending from the first protrusion to at least partially surround the body,
wherein the second hook comprises:
a second protrusion formed at a position spaced at a predetermined distance apart from the center of the steering wheel and spaced at a predetermined distance apart from the first protrusion; and
a second fixing part bent and extending from the second protrusion to at least partially surround the body.

2. The airbag device of claim 1, wherein
the body includes an elastic part having a detent portion retained in the fixing hole of the fixing part to prevent the body from being separated from the insertion hole.

3. The airbag device of claim 1, wherein a distance from a surface of the steering wheel to the first fixing part is larger than a distance from the surface of the steering wheel to the second fixing part.

4. The airbag device of claim 3, wherein a recessed portion is formed on the bottom surface of the mounting housing, and the body is slidably movable into and out of the recessed portion.

5. The airbag device of claim 4, wherein the mounting housing includes a plurality of bosses coupled to the steering wheel and providing an elastic restoring force between the mounting housing and the steering wheel,
the body is moved to the first hook by the elastic restoring force of the bosses.

6. The airbag device of claim 5, wherein the body is in contact with the first hook and the second hook.

7. The airbag device of claim 6, wherein the recessed portion has a depth larger than a distance between the first fixing part of the first hook and the body.

8. The airbag device of claim 2, wherein the detent portion comprises an end of the elastic part.

9. The airbag device of claim 7, wherein a gap is formed between the first fixing part of the first hook and the body of the mounting member.

* * * * *